(12) United States Patent
Kai

(10) Patent No.: US 11,941,303 B2
(45) Date of Patent: Mar. 26, 2024

(54) NON-TRANSITORY COMPUTER READABLE STORAGE MEDIUM STORING COMBINATION OF PROGRAMS INCLUDING PROGRAM FOR CONTROLLING IMAGE PROCESSING APPARATUS AND OPERATING SYSTEM

(71) Applicant: BROTHER KOGYO KABUSHIKI KAISHA, Aichi (JP)

(72) Inventor: Takafumi Kai, Nagoya (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 16/831,028

(22) Filed: Mar. 26, 2020

(65) Prior Publication Data
US 2020/0310702 A1 Oct. 1, 2020

(30) Foreign Application Priority Data
Mar. 29, 2019 (JP) ................................ 2019-065292

(51) Int. Cl.
*G06F 3/12* (2006.01)
(52) U.S. Cl.
CPC ............ *G06F 3/1205* (2013.01); *G06F 3/123* (2013.01); *G06F 3/1232* (2013.01); *G06F 3/1253* (2013.01)
(58) Field of Classification Search
CPC .... G06F 3/1205; G06F 3/1253; G06F 3/1232; G06F 3/123; G06F 3/1225; G06F 3/1228; G06F 3/1285
See application file for complete search history.

(56) References Cited

U.S. PATENT DOCUMENTS

| 2003/0137691 A1* | 7/2003 | Tanaka ................... G06F 3/1289 |
| | | 358/1.18 |
| 2006/0023230 A1* | 2/2006 | Nakata ................... G06F 3/1255 |
| | | 358/1.6 |
| 2009/0180140 A1* | 7/2009 | Kawamura ........... G06F 3/1284 |
| | | 358/1.15 |

(Continued)

FOREIGN PATENT DOCUMENTS

JP        2016018285 A        2/2016

*Primary Examiner* — Huo Long Chen
(74) *Attorney, Agent, or Firm* — Scully, Scott, Murphy & Presser, PC

(57) ABSTRACT

A non-transitory computer readable storage medium storing a combination of programs including a first program and an operating system. The first program controls an image processing apparatus. The combination includes a first acquisition process in which the operating system acquires a setting candidate value after the operating system receives a selection operation selecting the first program under a condition that the image processing apparatus is selected as a target for requesting an image process and a condition that content data is selected as a subject for the image process by the second program. The combination includes a receiving process in which the operating system receives a setting value based on the setting candidate value, a second acquisition process in which the first program acquires the setting value received in the receiving process, and a transmission process in which the first program transmits a job to an image processing apparatus.

18 Claims, 4 Drawing Sheets

(56) References Cited

U.S. PATENT DOCUMENTS

| | | | |
|---|---|---|---|
| 2011/0199640 A1* | 8/2011 | Shirai | G06F 3/1257 358/1.15 |
| 2011/0235064 A1* | 9/2011 | Arai | G06F 3/1205 358/1.2 |
| 2011/0279843 A1* | 11/2011 | Miyata | G06F 3/1279 358/1.13 |
| 2013/0263279 A1* | 10/2013 | Kobashi | G06F 3/1285 726/26 |
| 2014/0104643 A1* | 4/2014 | Park | G06F 3/1206 358/1.15 |
| 2015/0199157 A1* | 7/2015 | Xiao | G06F 3/1236 358/1.15 |
| 2018/0039461 A1* | 2/2018 | Wakasa | G06F 3/1254 |
| 2018/0220016 A1* | 8/2018 | Yamada | H04N 1/00307 |
| 2018/0275931 A1* | 9/2018 | Saigusa | G06F 3/1253 |
| 2019/0335045 A1* | 10/2019 | Yamada | G06F 9/5011 |
| 2020/0210793 A1* | 7/2020 | Tanaka | G06F 3/1285 |

\* cited by examiner

NON-TRANSITORY COMPUTER READABLE STORAGE MEDIUM STORING COMBINATION OF PROGRAMS INCLUDING PROGRAM FOR CONTROLLING IMAGE PROCESSING APPARATUS AND OPERATING SYSTEM

CROSS REFERENCE TO RELATED APPLICATION

This application claims priority from Japanese Patent Application No. 2019-065292 filed Mar. 29, 2019. The entire content of the priority application is incorporated herein by reference.

TECHNICAL FIELD

The present disclosure relates to a combination of programs installed on an information processing apparatus for controlling an image processing apparatus connected to the information processing apparatus.

BACKGROUND

A conventional technology used in an information processing apparatus such as a smartphone to achieve cooperative processing among a plurality of application programs (hereinafter called "applications") installed on the information processing apparatus is well known in the art. This technology enables one application to call another application in order to hand over a process. One such technology known in the art coordinates processing among applications using a technique called a URL scheme. With this technique, print settings are passed when a general-purpose application calls a printing application.

SUMMARY

Since the general-purpose application passes print settings to the printing application, the conventional technology eliminates the need to set print settings in the printing application. However, when the general-purpose application does not support setting values specific to the image processing apparatus, such setting values cannot be easily reflected in the print settings.

Therefore, it is an object of the present disclosure to provide a technology capable of reflecting setting values specific to an image processing apparatus in print settings while sharing data among a combination of application programs installed on the information processing apparatus.

In order to attain the above and other objects, the disclosure provides a non-transitory computer readable storage medium storing a combination of programs including a first program and an operating system. The combination of programs is executed by a computer included in an information processing apparatus on which a second program is installed. The first program is for controlling an image processing apparatus. Execution of the combination of programs causes the computer to perform: a first acquisition process in which the operating system acquires a setting candidate value after the operating system receives a selection operation selecting the first program under a condition that the image processing apparatus is selected as a target for requesting an image process and a condition that content data is selected as a subject for the image process by the second program, the setting candidate value being provided from the first program and settable for the image process executed by the image processing apparatus; a receiving process in which the operating system receives a setting value based on the setting candidate value acquired by the operating system, the setting value being to be set for the image process; a second acquisition process after the setting value is received in the receiving process, in the second acquisition process the first program acquires the setting value received in the receiving process; and a transmission process in which the first program transmits a job to the image processing apparatus, the job being for the image process based on the setting value and the content data, the transmission process being executed after the setting value is acquired in the second acquisition process.

According to another aspect, the disclosure provides a non-transitory computer readable storage medium storing a first program. The first program is executed by a computer included in an information processing apparatus on which an operating system and a second program are installed. The first program is for controlling an image processing apparatus. Execution of the first program causes the computer to perform: transmitting a setting candidate value to the operating system in response to a request from the operating system, the operating system transmitting the request to the first program after the operating system receives a selection operation selecting the first program under a condition that the image processing apparatus is selected as a target for requesting an image process and a condition that content data is selected as a subject for the image process by the second program, the setting candidate value being settable for the image process executed by the image processing apparatus, wherein when the operating system receives the setting candidate value from the first program, the operating system receives a setting value based on the setting candidate value, the setting value being to be set for the image process; acquiring the setting value via the operating system after the operating system receives the setting value; and transmitting a job to the image processing apparatus after the setting value is acquired, the job being for the image process based on the setting value and the content data, the transmission process being executed after the setting value is acquired via the operating system.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
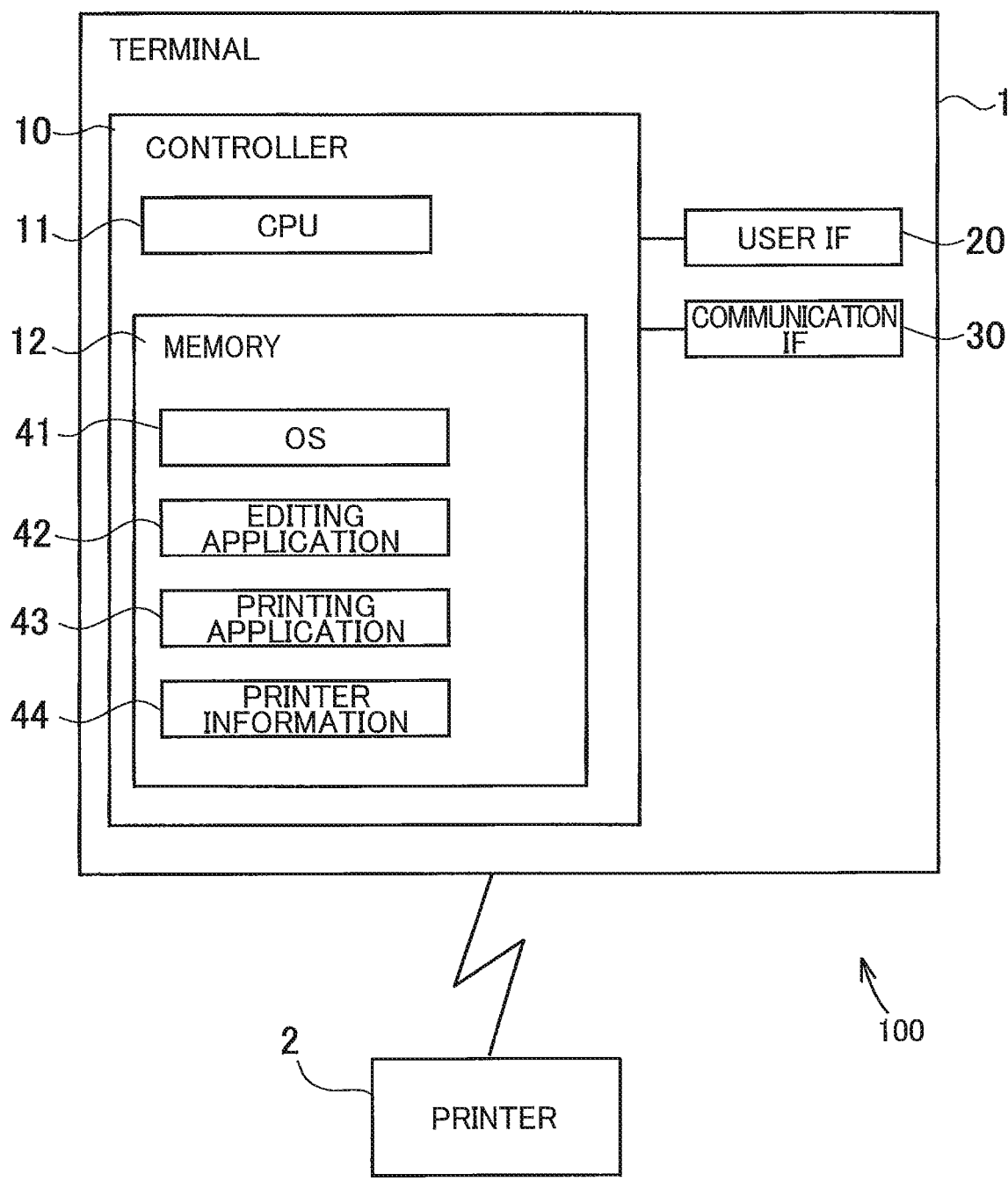
FIG. 1 is a block diagram illustrating electrical configurations of a printing system according to a first embodiment.

A configuration using a combination of programs will be described while referring to the drawings. The combination of programs in this example is executed by a terminal device connectable to a printer.

FIG. 1 shows a printing system 100 including a terminal 1 and a printer 2 according to the example. The terminal 1 is provided with a controller 10, a user interface 20, and a communication interface 30. The user interface 20 and the communication interface 30 are electrically connected to the controller 10. The terminal 1 is envisioned to be one of various terminal devices, such as a desktop or laptop personal computer, a smartphone, or a tablet computer. The terminal 1 is an example of the information processing apparatus.

The user interface 20 is a touchscreen, for example, that includes hardware for displaying information and for receiving user operations. The user interface 20 is an example of the display. Note that the user interface 20 may be a combination of a display having a display function; and a keyboard, mouse, and the like having input receiving functions.

The communication interface 30 includes hardware for communicating with various external devices. The communication interface 30 may include a plurality of interfaces with different communication methods, such as network communication and USB communication.

As shown in FIG. 1, the terminal 1 can communicate with the printer 2 via the communication interface 30. The printer 2 is a device having a printing function. The printer 2 can communicate with the terminal 1 through local communication or network communication. The printer 2 is an example of the image processing apparatus. The terminal 1 may also be capable of connecting to the Internet via the communication interface 30.

As shown in FIG. 1, the controller 10 of the terminal 1 includes a CPU 11, and a memory 12. The memory 12 includes ROM, RAM, and nonvolatile memory for storing various programs, such as application programs (hereinafter called "applications"), various data, and the like. This specification will not focus on details of the memory.

The CPU 11 executes various processes according to programs read from the memory 12 or instructions received from the user. The CPU 11 is an example of the computer. The controller 10 in FIG. 1 is a general concept that covers the hardware and software used for controlling the terminal 1 and does not necessarily represent a single piece of hardware present in the terminal 1.

As shown in FIG. 1, the memory 12 stores an operating system (hereinafter called an "OS") 41, an editing application 42, a printing application 43, and printer information 44. The OS 41 is iOS (registered trademark) or Android (registered trademark), for example. Alternatively, the OS 41 may be Microsoft Windows (registered trademark), MacOS (registered trademark), or Linux (registered trademark).

The editing application 42 is an application for viewing, playing, managing, and editing data for such content as text, photos, videos, and illustrations. The editing application 42 is an example of the second program. The editing application 42 receives a specification selecting content data, which is stored in the memory 12 or a cloud server connected to the Internet, and receives instructions for processing the selected content data. Instructions that the editing application 42 receives for processing content data may include an instruction for performing a process to receive a selection of content data and to display or play the content; an instruction for performing an editing process on selected content data, such as cropping and color conversion; and an instruction for performing a process such as copy or delete on selected content data. Note that the editing application 42 should at least have a function for receiving a selection of content data, but need not have functions for performing various processes on the content data.

The printing application 43 is an application that communicates with the printer 2 and directs the printer 2 to execute a print. The printing application 43 is provided by the vendor of the printer 2, for example, and is installed on the terminal 1 in response to a user command when setting up the printer 2 or the like. The printing application 43 is an example of the first program and the program. The combination of the OS 41 and the printing application 43 is an example of the combination of programs. The printing application 43 may be compatible with a plurality of printer models.

When the printing application 43 is installed on the terminal 1, the printing application 43 receives a user selection for devices that will be used to perform printing. The steps in the processes performed by each program during device selection will be described with reference to the sequence diagram in FIG. 2. The CPU 11 of the terminal 1 executes a process for each of the following steps based on the corresponding program. So, steps performed by the CPU 11 according to instructions described in an application or an OS may be described in abbreviated terms, such as "the CPU 11 executes" or "the editing application 42 executes" or "the OS 41 executes."

Figure 2:
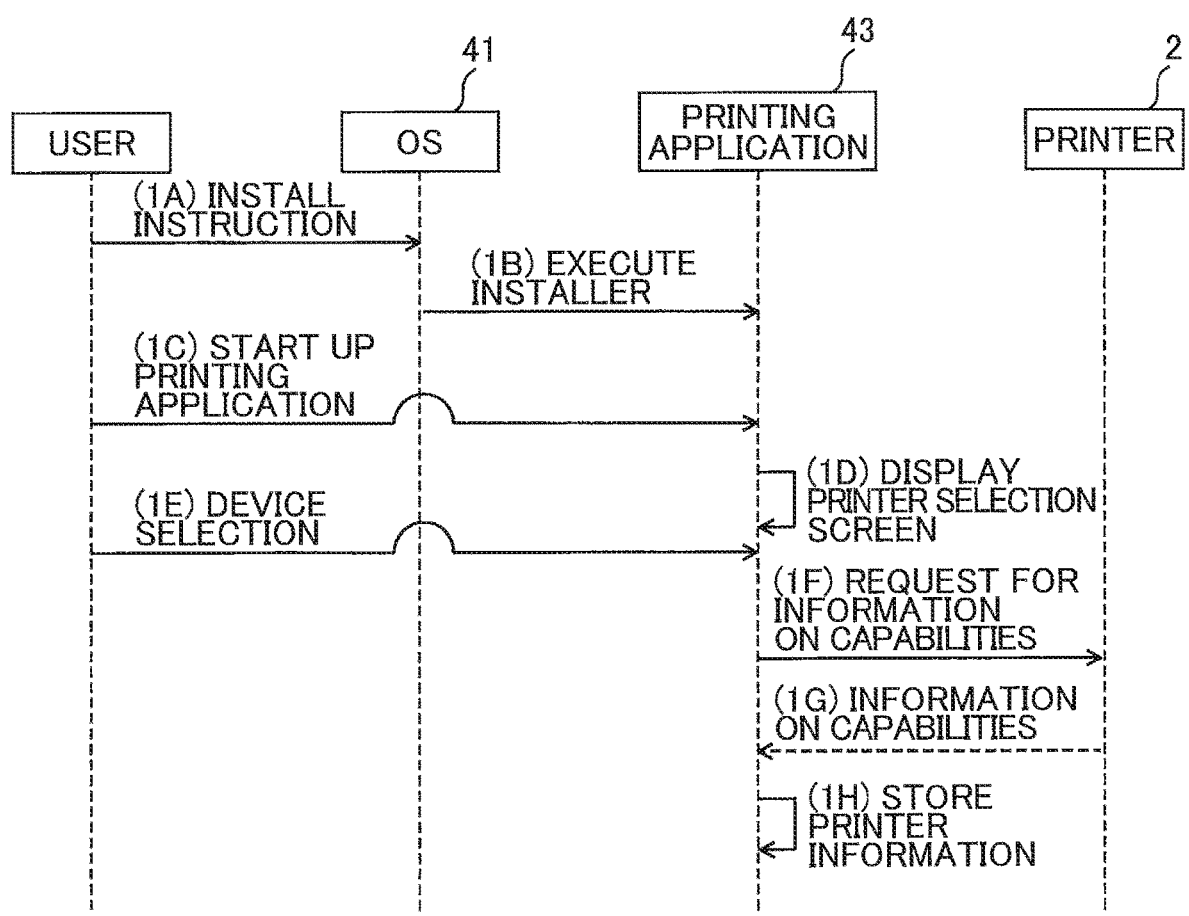
FIG. 2 is a sequence diagram illustrating operations of programs for selecting an apparatus according to the first embodiment.

In step 1A of FIG. 2, the user instructs the OS 41 to install the printing application 43. In step 1B the OS 41 executes an installer for the printing application 43 and installs the printing application 43 on the terminal 1. After installation is complete, in step 1C the user instructs the printing application 43 to start.

When the printing application 43 is first executed in a state where any device to be used for printing has not set for the printing application 43, in step 1D the printing application 43 displays a printer selection screen on the user interface 20. Here, the printing application 43 queries the OS 41 for available devices, receives a list of devices from the OS 41, and displays these devices as selections, for example. In step 1E the printing application 43 receives a device selection from the user.

Upon receiving the device selection (a selection for the printer 2 in this case), in step 1F the printing application 43 initiates communications with the printer 2 and requests the printer 2 information on the capabilities of the printer 2. In step 1G the printer 2 transmits information on its capabilities to the terminal 1 in response to the request in step 1F. Information on the capabilities of the printer 2 indicates the ranges of acceptable print settings for the printer 2 and includes model information of the printer 2 and information on options available on the printer 2, for example. The capability information for the printer 2 includes information on device-specific functions that can be implemented by the printer 2.

Upon receiving information on the capabilities of the printer 2, in step 1H the printing application 43 generates the printer information 44 as information on the printer 2 and stores the printer information 44 in a prescribed storage area of the memory 12. The process of step 1H is an example of the process for storing the setting candidate values, and the printer information 44 is an example of the setting candidate value. Thus, the printing application 43 and the printer information 44 are in a stored state in the memory 12, as indicated in FIG. 1, upon completion of this process. Alternatively, the printing application 43 may receive a selection for a device during installation and may store the printer information 44 at this time.

The printer information 44 includes information specifying configurable setting items on the printer 2 and the range of possible values for each item, information on default print settings, and information for displaying a screen in which the user can select print settings, for example. The printer information 44 also includes information on device-specific functions that can be executed on the printer 2, and information on device-specific functions that can be processed by the printing application 43. The default print settings may be acquired from the printer 2, may be provided in the printing application 43 in advance, or may be specified by the user.

The storage area of the printer information 44 is an area that the OS 41 has allocated for the printing application 43. Both the printing application 43 and the OS 41 can reference (or access) the printer information 44. In other words, the storage area of the printer information 44 is shared by the OS 41 and the printing application 43. Information included in the printer information 44 may be information that at least both the printer 2 and the printing application 43 can interpret, but may be meaningless information to the OS 41.

The printing application 43 also has a function to receive a designation for a default printer. When a plurality of printers is connected to the terminal 1, the printing application 43 sets one of the printers to the default printer based on a user designation. In this case, on the terminal 1 that is connected to the plurality of printers, the printing application 43 stores all information described above in the printer information 44 in association with information identifying each printer.

The printing application 43 receives various other user specifications following step 1H. For example, the user can specify content data and print settings in an operation screen of the printing application 43 and can input a print command in this screen to direct the printer 2 to print the specified content data.

Next, steps in a process according to the first embodiment executed on the terminal 1 after the printing application 43 has been installed will be described with reference to the sequence diagram in FIG. 3. The following process is performed according to the various programs executed by the terminal 1 for directing the printer 2 to print an image based on content data specified through the editing application 42. In the following process, the editing application 42 and the printing application 43 have been installed on the terminal 1. The description below begins after the editing application 42 has been started through a user instruction and the operation screen of the editing application 42 has been displayed on the user interface 20 of the terminal 1. Note that the printing application 43 is not executing at the start of the process in FIG. 3.

Figure 3:
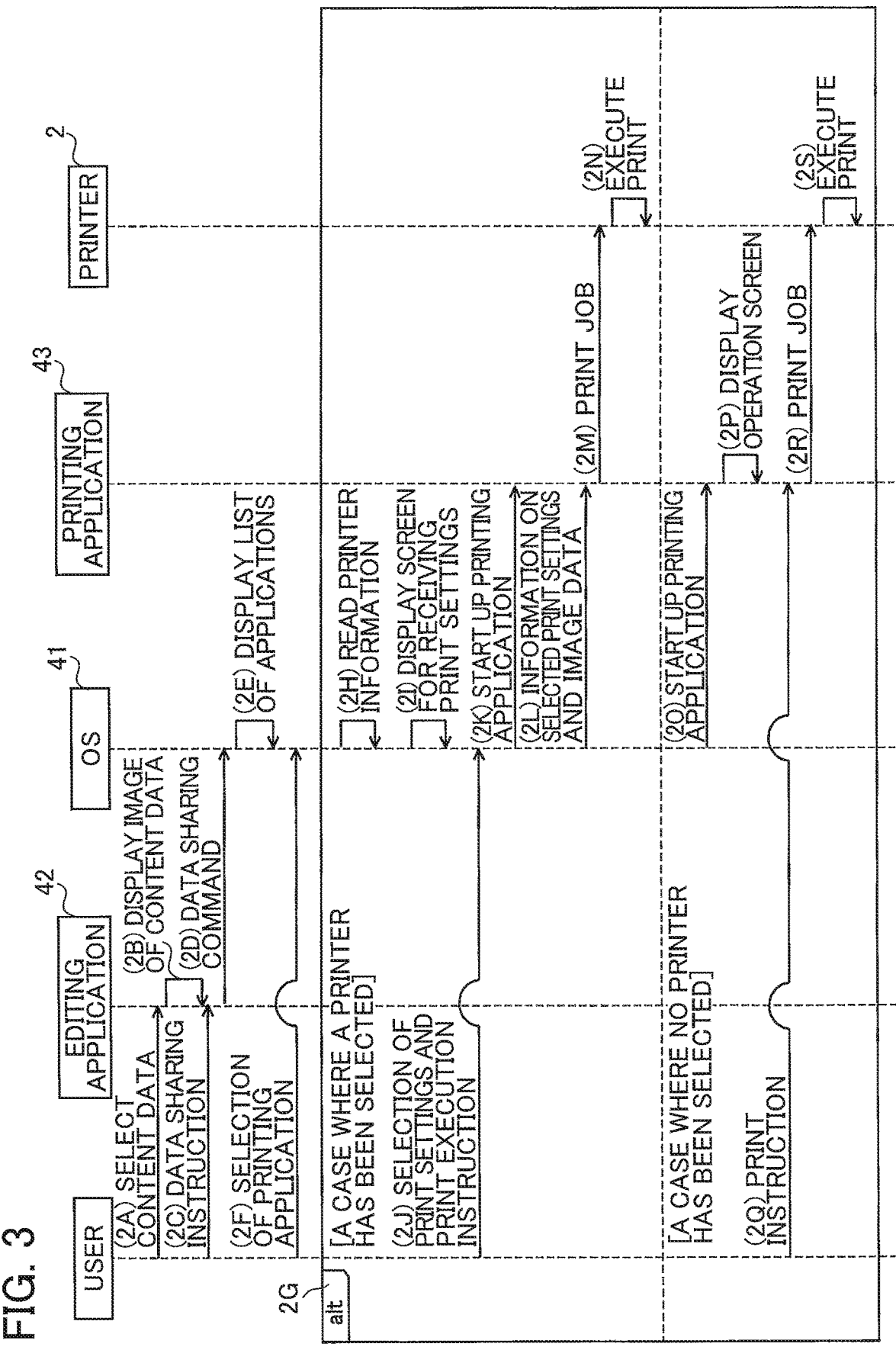
FIG. 3 is a sequence diagram illustrating operations of the programs when executing printing according to the first embodiment.

In step 2A at the beginning of FIG. 3, the user performs operations to display a list of content data stored in the memory 12 or stored on a cloud server, for example, on the user interface 20 and to select content data from the list. The editing application 42 receives the selection of the content data. In step 2B the editing application 42 displays a screen on the user interface 20 based on the selected content data.

In addition to displaying the image in step 2B, the editing application 42 displays, together with an image represented by the selected content data, a plurality of tabs and icons on the user interface 20 for receiving instructions on processing the selected content data. The editing application 42 of the embodiment has a sharing function to execute, as a process for content data, a process for sharing one item of content data among a plurality of applications. For this reason, the icons displayed in the editing application 42 include a share icon for instructing the sharing of data.

In step 2C the user operates the share icon to select sharing as the process for the content data. Upon receiving the operation on the share icon, in step 2D the editing application 42 passes a data sharing command to the OS 41. The OS 41 has information indicating the applications that can share content data. Hence, when the OS 41 receives the sharing command, in step 2E the OS 41 displays a list of applications that can share content data on the user interface 20 as options for sharing destinations.

When the printing application 43 of the embodiment is installed on the terminal 1, the printing application 43 is registered in the OS 41 as an application capable of sharing content data. Thus, in step 2E the OS 41 displays a list of selectable options of applications including the printing application 43 as a selectable option for the process to share content data. Other possible options include an application for sending content by email, an application for posting content on a social networking service, and an application for uploading content to the cloud. Alternatively, in step 2E, the OS 41 may display a list of selectable options of processes, such as a process for printing, a process for sending content by email, a process for posting content on a social networking service, and a process for uploading content to the cloud. In this case, selection of one of the processes indicates selection of one of the applications corresponding to the selected process.

The example in FIG. 3 describes a case in which the user has selected the printing application 43 as the sharing destination. Thus, in step 2F the user performs an operation to select the printing application 43 from the list displayed on the user interface 20. The operation performed in step 2F is an example of the selection operation. Upon receiving a selection for the printing application 43, in step 2G the OS 41 determines whether a default printer has been set. As described above, the printing application 43 has a function for receiving a selection for a default printer.

When a default printer has been selected, in step 2H the OS 41 reads the printer information 44 that was stored in the memory 12 in step 1H described above (see FIG. 2) by the printing application 43. Through step 2H, the OS 41 acquires the printer information 44. Step 2H is an example of the first acquisition process.

When information on a plurality of printers has been stored as the printer information 44, the OS 41 reads information on the printer selected to be the default printer. The following example describes a case in which the printer 2 has been selected as the default printer. As described above, the storage area of the printer information 44 is shared by the OS 41 and the printing application 43. Thus, the OS 41 can read the printer information 44 without starting the printing application 43.

In step 2I the OS 41 displays a screen on the user interface 20 for receiving selections of print settings. The OS 41 displays the screen based on the information acquired from the printer information 44. In step 2J the user selects print settings in the display screen and make an instruction to execute a printing operation, and the OS 41 receives the selections and the instruction. Step 2J is an example of the receiving process. The print settings received in step 2J are an example of the settings information.

Upon receiving the instruction to execute a print, in step 2K the OS 41 starts up the printing application 43, and in step 2L passes information on the selected print settings and data for the image to be printed to the printing application 43. Step 2L is an example of the second acquisition process and the acquisition process. The image to be printed is an image based on the content data selected in step 2B and is the image currently displayed on the user interface 20, for example. In step 2M the printing application 43 generates a print job based on the information received from the OS 41 and sends the print job to the printer 2. Step 2M is an example of the transmission process. When the printer 2 receives the print job, in step 2N the printer 2 executes a print based on the print job. After transmitting the print job in step 2M, the printing application 43 terminates itself.

Note that rather than displaying on the user IF 20 the screen (or a window) of the printing application 43 as an active screen in steps 2K and 2L. Here, the active screen of an application (the printing application 43 in this case) indicates a screen actively representing the result of current processes executed by the application (the printing application 43) and actively responding to operations inputted by the user. The OS 41 starts up the printing application 43 while keeping displaying on the user IF 20 the screen of the editing application 42 as an active screen. Normally when started up, a startup screen of the printing application 43 is displayed as an active screen. However, since the printing application 43 is not displayed in the process of step 2K, the startup screen of the printing application 43 is not displayed, and the operation screen of the editing application 42 remains displayed on the user interface 20. In this example, the editing application 42 remains displayed during steps 2B-2N. Preventing change in the active screen can reduce annoyance that the user may experience when the display (the active screen) is switched, and printing can start while the operation screen of the editing application 42 is still displayed.

On the other hand, if the OS 41 determines in step 2G that a default printer has not been selected, in step 2O the OS 41 starts up the printing application 43. In this case, the OS 41 sets and displays a screen (or a window) of the printing application 43 as an active screen. Unlike when the printing application 43 is started in step 2K, print settings and data for an image to be printed are not passed to the printing application 43 when the printing application 43 is started in step 2O. In step 2P the printing application 43 displays its own operation screen on the user interface 20. Step 2P is an example of the selection process. The operation screen of the printing application 43 is configured to receive a printer selection and selections for print settings. In this case, in steps 2O-2P the editing application 42 is not displayed as an active screen. Accordingly, by displaying the operation screen of the printing application 43 when a default printer has not yet been selected, the printing application 43 can receive user selections directly.

In step 2Q the printing application 43 receives a selection for a printer and selections for print settings inputted by the user, as well as an instruction for executing a print and the like. In step 2R the printing application 43 generates a print job based on the received instructions and transmits the print job to the selected printer 2. Upon receiving the print job, in step 2S the printer 2 executes the print. Hence, when started in step 2O, the printing application 43 performs processes as normal and does not terminate until a terminate instruction is received from the user.

Next, steps in a process executed according to a second embodiment on the terminal 1 having the printing application 43 installed thereon will be described with reference to the sequence diagram in FIG. 4. The terminal 1 executes the process according to the second embodiment based on each of the programs for directing the printer 2 to print an image based on content data specified in the editing application 42. The second embodiment differs from the first embodiment in the operations performed by the OS 41 when the printing application 43 is selected as the sharing destination. Steps in the second embodiment that are identical to those described in the first embodiment have been assigned the same step numbers to avoid duplicating description. At the beginning of the process in FIG. 4, the printing application 43 is not executing.

Figure 4:
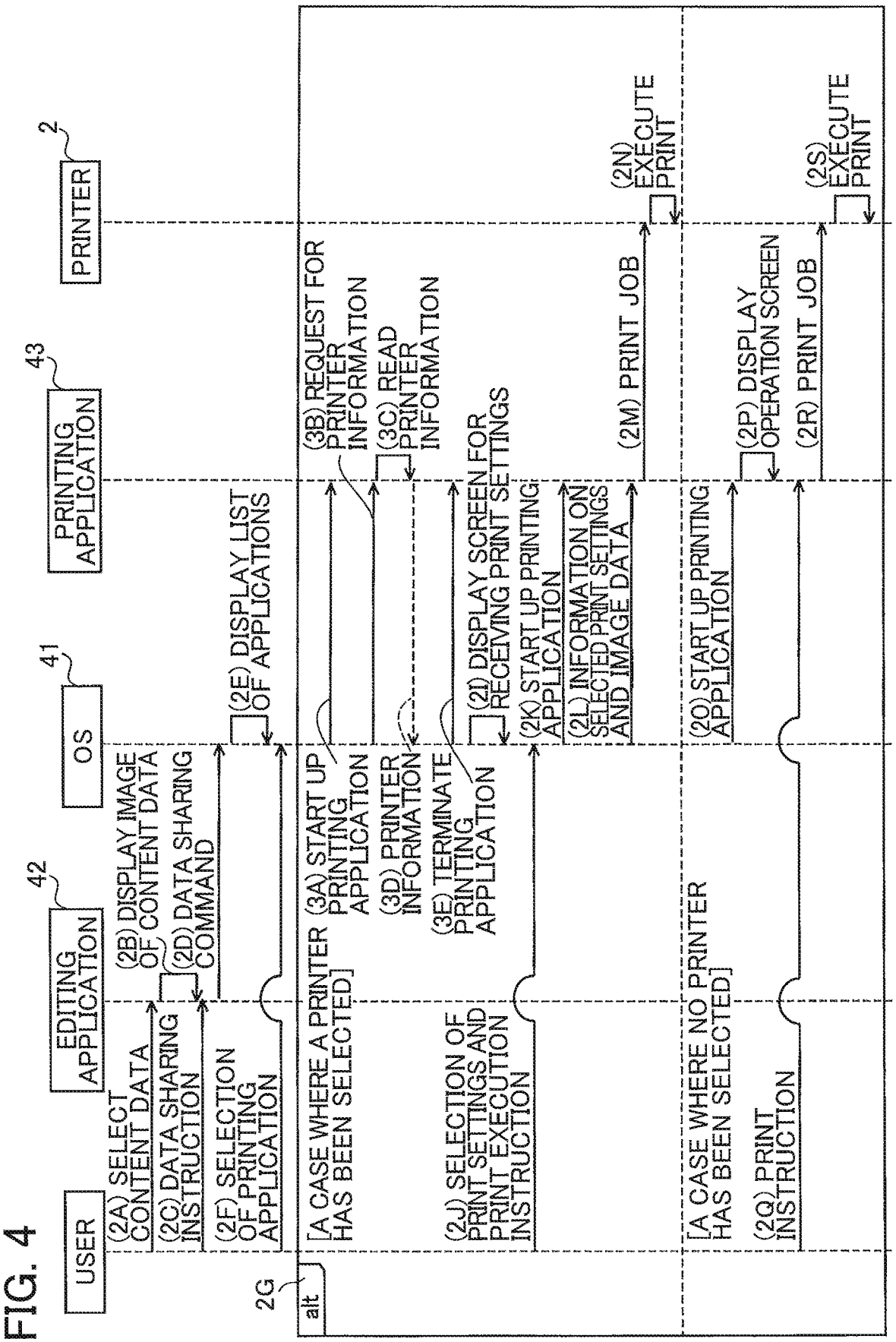
FIG. 4 is a sequence diagram illustrating operations of the programs when executing printing according to a second embodiment.

As shown in FIG. 4, in step 2A the editing application 42 receives selection of content data. In step 2B the editing application 42 displays a screen on the user interface 20 based on the selected content data. In step 2C the user operates the share icon to select sharing, and in step 2D the editing application 42 passes a data sharing command to the OS 41. In step 2E the OS 41 displays a list of selectable options of applications including the printing application 43. In step 2F the user performs an operation to select the printing application 43 from the list displayed on the user interface 20. Upon receiving a selection for the printing application 43, in step 2G the OS 41 determines whether a default printer has been set.

When the printer 2 has been selected as the default printer, in step 3A the OS 41 starts up the printing application 43. In step 3B the OS 41 issues a request to the printing application 43 for the printer information 44 relevant to the printer 2. In response to the request in step 3B, in step 3C the printing application 43 reads the printer information 44 from the memory 12, and in step 3D transmits the printer information 44 to the OS 41 as a response to the request. Through step 3D, the OS 41 acquires the printer information 44. Steps 3A through 3D are an example of the first acquisition process, and step 3D is an example of the response process. Upon receiving the response in step 3D, in step 3E the OS 41 terminates the printing application 43.

Note that when information on the printer 2 is not stored in the printer information 44, in place of the process in step 3C the printing application 43 communicates with the printer 2 to acquire capability information from the printer 2. In this case, the printing application 43 stores the printer information 44 in the memory 12 based on the information acquired from the printer 2 and subsequently issues a response in step 3D.

The OS 41 does not display the screen of the printing application 43 as an active screen in steps 3A through 3E, but rather acquires the printer information 44 while the editing application 42 remains displayed as an active screen. Therefore, the operation screen of the editing application 42 remains displayed on the user interface 20 during these processes. Avoiding a change in the active screen can reduce annoyance that the user may experience when the active screen is switched. The editing application 42 remains displayed during steps 2B-2J in this example.

In step 2I the OS 41 displays a screen on the user interface 20 for receiving selections of print settings. The OS 41 displays the screen based on the information acquired from the printer information 44. In step 2J the user selects print settings in the display screen and make an instruction to execute a printing operation, and the OS 41 receives the selections and the instruction. In step 2K the OS 41 starts up the printing application 43, and in step 2L passes information on the selected print settings and data for the image to be printed to the printing application 43. In step 2M the printing application 43 generates a print job based on the information received from the OS 41 and sends the print job to the printer 2. In step 2N the printer 2 executes a print based on the print job.

On the other hand, if the OS 41 determines in step 2G that a default printer has not been selected, in step 2O the OS 41 starts up the printing application 43. In this case, the OS 41 sets and displays the printing application 43 to be an active screen on startup. In step 2P the printing application 43 displays its own operation screen on the user interface 20 so as to receive a printer selection and selections for print settings. In step 2Q the printing application 43 receives a selection for a printer and selections for print settings inputted by the user, as well as an instruction for executing a print. In step 2R the printing application 43 generates a print job based on the received selections and the received instruction and transmits the print job to the selected printer 2. Upon receiving the print job, in step 2S the printer 2 executes the print.

As described above in detail, information on print settings specific to the printer 2 can be shared through the combination of the OS 41 and the printing application 43. When the printing application 43 is specified by the OS 41 while the printer 2 has been selected and content data has been selected in the editing application 42, the printing application 43 can pass the printer information 44, which includes information on print settings available (or settable) for printing on the printer 2, to the OS 41. Further, when the OS 41 passes to the printing application 43 information on print settings received based on the printer information 44, the printing application 43 transmits a job to the printer 2 based on this print settings information and the content data. This configuration not only allows the coordination of content data between programs, but can effectively utilize device-specific functions on the printer 2 since print settings can be set using information on the print settings available for printing on the printer 2.

While the disclosure has been described in detail with reference to the above embodiments, it would be apparent to those skilled in the art that various changes and modifications may be made thereto. For example, the device to execute the printing need not be a printer, but may be devices having a printing function, such as a multifunction peripheral, a copying machine, and a facsimile machine.

The destination device for the transmission of print jobs is not limited to printers or other devices having a printing function, but may be a server managed by a cloud service or another device that stores content data. In the latter case, the printer information 44 stores settings information related to data storage in place of (or in addition to) the print settings.

Although the printing application 43 is not displayed as an active screen in steps 2K and 2L and steps 3A through 3E in the embodiments described above, the printing application 43 may instead be displayed as an active screen during these processes. However, the user can more readily understand that the selected content data is being processed when the screen for the editing application 42 remains displayed as an active screen, rather than when the printing application 43 is displayed as an active screen.

In the second embodiment, the printing application 43 need not be terminated in step 3E. In other words, steps 3E and 2K may be eliminated from the second embodiment.

When an error occurs on the printer 2, for example, the printing application 43 may receive information from the printer 2 and pass information on the error to the OS 41 or the editing application 42 so that the error information is displayed.

In any of the flowcharts disclosed in the embodiments, the plurality of processes that make up any of the plurality of steps may be executed in parallel, or the order in which the processes are performed may be modified in any way that does not produce any inconsistencies in the processes.

The processes disclosed in the embodiments may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. A non-transitory computer readable storage medium storing a combination of programs including a first application program and an operating system, the combination of programs being executed by a computer included in an information processing apparatus on which a second application program is installed, the first application program being for controlling an image processing apparatus, execution of the combination of programs causing the computer to perform:

a first acquisition process in which the operating system automatically acquires, without using the first application program, setting candidate values associated with the image processing apparatus from a storage area on the information processing apparatus shared by the operating system and the first application program after the operating system receives a selection operation selecting the first application program under a condition that the image processing apparatus is selected as a target for requesting an image process and a condition that content data is selected as a subject for the image process by the second application program, the setting candidate values being provided to the storage area from the first application program and settable for the image process executed by the image processing apparatus, the setting candidate values enabling the image processing apparatus to perform a device-specific function of the image processing apparatus;

a receiving process in which the operating system, without using the first application program, receives a setting value selected from the setting candidate values acquired by the operating system and an instruction to execute the device-specific function of the image processing apparatus, the setting value being to be set for the image process to enable the image processing apparatus to perform the device-specific function of the image processing apparatus;

in response to the instruction to execute the device-specific function of the image processing apparatus and after the setting value is received in the receiving process, a second acquisition process in which the first application program is started and acquires the setting value, which enables the image processing apparatus to perform the device-specific function of the image processing apparatus, received in the receiving process, the first application program being a printing application; and a transmission process in which the first application program transmits a job to the image processing apparatus, the job being for the image process based on the setting value to enable the image processing apparatus to perform the device-specific function of the image processing apparatus and the content data, the transmission process being executed after the setting value is acquired in the second acquisition process.

2. The non-transitory computer readable storage medium according to claim 1, wherein the operating system causes the computer to perform a sharing function to share data among a plurality of programs installed on the information processing apparatus, wherein the selection operation is for selecting the first application program as a program that can share, by using the sharing function, the content data which is selected by the second application program.

3. The non-transitory computer readable storage medium according to claim 1, wherein the operating system receives the selection operation while the second application program controls a display to display an operation screen.

4. The non-transitory computer readable storage medium according to claim 1, wherein the information processing apparatus includes a memory having the storage area,
wherein the execution of the combination of programs causes the computer to perform a storing process in which the first application program acquires the setting candidate value from the image processing apparatus, and stores the acquired setting candidate value in the memory.

5. The non-transitory computer readable storage medium according to claim 1, wherein in the second acquisition process, the operating system transmits the setting value to the first application program.

6. The non-transitory computer readable storage medium according to claim 5, wherein the information processing apparatus further includes a display,
wherein when the first application program is started in the second acquisition process, the display maintains displaying a screen which represents a result of a process executed by the second application program but does not display a screen which represents a result of a process executed by the first application program.

7. The non-transitory computer readable storage medium according to claim 1, wherein the information processing apparatus further includes a display,
wherein the execution of the combination of programs causes the computer to perform a selecting process in which the first application program is started, and controls the display to display a selection screen for selecting an apparatus as the target for requesting the image process after the operating system receives a selection operation specifying the first application program under a condition that no apparatus is selected as the target for requesting the image process and a condition that the content data is selected by the second application program.

8. The non-transitory computer readable storage medium according to claim 1, wherein the image processing apparatus is a printer capable of printing,
wherein the job is for instructing the printer to execute printing based on the setting value and the content data.

9. A non-transitory computer readable storage medium storing a combination of programs including a first application program and an operating system, the combination of programs being executed by a computer included in an information processing apparatus on which a second application program is installed, the first application program being for controlling an image processing apparatus, execution of the combination of programs causing the computer to perform:
a first acquisition process in which the operating system in response to receiving the selection operation, starts up the first application program, sends a request for setting candidate values to the first application program, receives the setting candidate values from the first application program as a response to the request, and terminates the first application process after the operating system receives a selection operation selecting the first application program under a condition that the image processing apparatus is selected as a target for requesting an image process and a condition that content data is selected as a subject for the image process by the second application program, the setting candidate values being provided from the first application program and settable for the image process executed by the image processing apparatus, the setting candidate values enabling the image processing apparatus to perform a device-specific function of the image processing apparatus;
a receiving process in which the operating system, without using the first application program, receives a setting value selected from the setting candidate values acquired by the operating system and an instruction to execute the device-specific function of the image processing apparatus, the setting value being to be set for the image process to enable the image processing apparatus to perform the device-specific function of the image processing apparatus;
in response to the instruction to execute the device-specific function of the image processing apparatus and after the setting value is received in the receiving process, a second acquisition process in which the first application program is restarted and acquires the setting value, which enables the image processing apparatus to perform the device-specific function of the image processing apparatus, received in the receiving process, the first application program being a printing application; and
a transmission process in which the first application program transmits a job to the image processing apparatus, the job being for the image process based on the setting value to enable the image processing apparatus to perform the device-specific function of the image processing apparatus and the content data, the transmission process being executed after the setting value is acquired in the second acquisition process.

10. The non-transitory computer readable storage medium according to claim 4, wherein the information processing apparatus further includes a display,
wherein when the first application program is started in the first acquisition process, the display maintains displaying a screen which represents a result of a process executed by the second application program but does not display a screen which represents a result of a process executed by the first application program.

11. A non-transitory computer readable storage medium storing a first application program, the first application program being executed by a computer included in an information processing apparatus on which an operating system and a second application program are installed, the first application program being for controlling an image processing apparatus, execution of the first application program causing the computer to perform:
transmitting setting candidate values associated with the image processing apparatus to the operating system in response to a request from the operating system, the operating system transmitting the request to the first application program after the operating system starts up the first application program and receives a selection operation selecting the first application program under a condition that the image processing apparatus is selected as a target for requesting an image process and a condition that content data is selected as a subject for the image process by the second application program, the setting candidate values being settable for the image process executed by the image processing apparatus, the setting candidate values enabling the image processing apparatus to perform a device-specific function of the image processing apparatus, the first application program being terminated by the operating system after transmitting the setting candidate values, the operating system receiving a setting value selected from the setting candidate values and restarting the first application program, the setting value being to be set for the image process to enable the image processing apparatus to perform the device-specific function of the image processing apparatus, the first application program being a printing application;

acquiring the setting value via the operating system after the operating system receives the setting value; and transmitting a job to the image processing apparatus after the setting value is acquired, the job being for the image process based on the setting value to enable the image processing apparatus to perform the device-specific function of the image processing apparatus and the content data, the transmitting being executed after the setting value is acquired via the operating system.

12. The non-transitory computer readable storage medium according to claim 11, wherein the operating system causes the computer to perform a sharing function to share data among a plurality of programs installed on the information processing apparatus, wherein the selection operation is for selecting the first application program as a program that can share, by using the sharing function, the content data which is selected by the second application program.

13. The non-transitory computer readable storage medium according to claim 11, wherein after the operating system receives the selection operation and starts up the first application program, the operating system sends the request to the first application program, and the first application program transmits the setting value as a response to the request.

14. The non-transitory computer readable storage medium according to claim 11, wherein the information processing apparatus includes a memory, wherein execution of the first application program causes the computer to perform:
acquiring the setting candidate value from the image processing apparatus; and
storing the acquired setting candidate value in the memory.

15. The non-transitory computer readable storage medium according to claim 11, wherein after the first application program transmits the setting candidate value to the operating system, the operating system receives the setting value, starts up the first application program, and transmits the setting value to the first application program, and the first application program acquires the setting value transmitted from the operating system.

16. The non-transitory computer readable storage medium according to claim 15, wherein the information processing apparatus further includes a display, wherein in a case where the operating system starts up the first application program after the first application program transmits the setting candidate value to the operating system, the display maintains displaying a screen which represents a result of a process executed by the second application program but does not display a screen which represents a result of a process executed by the first application program.

17. The non-transitory computer readable storage medium according to claim 11, wherein the information processing apparatus further includes a display, wherein execution of the first application program causes the computer to perform controlling the display to display a selection screen for selecting an apparatus as the target for requesting the image process after the operating system receives a selection operation specifying the first application program under a condition that no apparatus is selected as the target for requesting the image process and a condition that the content data is selected by the second application program.

18. The non-transitory computer readable storage medium according to claim 11, wherein the image processing apparatus is a printer capable of printing, wherein the job is for instructing the printer to execute printing based on the setting value and the content data.

* * * * *